United States Patent [19]

Fortini

[11] Patent Number: 5,781,270
[45] Date of Patent: Jul. 14, 1998

[54] FRAME FOR SPECTACLES WITHOUT SURROUND

[75] Inventor: Paolo Fortini, Florence, Italy

[73] Assignee: Bottega D'Arte In Firenze S.r.l., Florence, Italy

[21] Appl. No.: 615,276

[22] PCT Filed: Jan. 4, 1995

[86] PCT No.: PCT/IT95/00001

§ 371 Date: Mar. 5, 1996

§ 102(e) Date: Mar. 5, 1996

[87] PCT Pub. No.: WO96/02014

PCT Pub. Date: Jan. 25, 1996

[30] Foreign Application Priority Data

Jul. 11, 1994 [IT] Italy ................................ FI94U0077
Nov. 17, 1994 [IT] Italy ................................ FI94U0122

[51] Int. Cl.⁶ .......................... G02C 1/02; G02C 5/22
[52] U.S. Cl. .................... 351/110; 351/113; 351/121; 351/133; 351/153; 16/228
[58] Field of Search ....................... 351/70, 110, 111, 351/113, 114, 119, 121, 124, 133, 140, 141, 151, 153; 16/228

[56] References Cited

U.S. PATENT DOCUMENTS 718,363  1/1903  Lembke ........................... 351/113

*Primary Examiner*—Huy Mai
*Attorney, Agent, or Firm*—McGlew and Tuttle

[57] ABSTRACT

The frame for spectacles without surround comprises: a pair of arms (3); for each arm, an element (7) for connection to the respective lens (L); an intermediate bridge (5) for the connection of the two lenses (L); a pair of pads (31) for support on the nose; means for locking the bridge and the connecting elements to the respective lenses. Advantageously, the connecting elements (7) each exhibit a first bent end forming a helical spring (7A) intended to be inserted in a corresponding hole (LF) of the respective lens (L); the locking means comprise, for each lens, a screw (15) inserted coaxially in said spring.

28 Claims, 4 Drawing Sheets

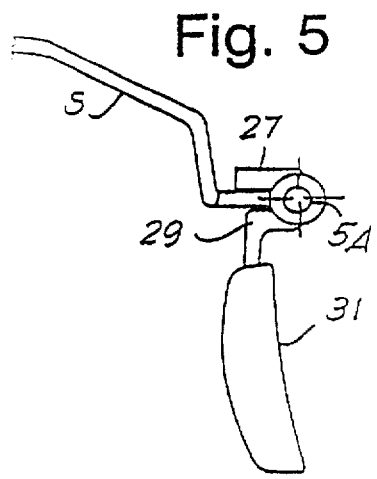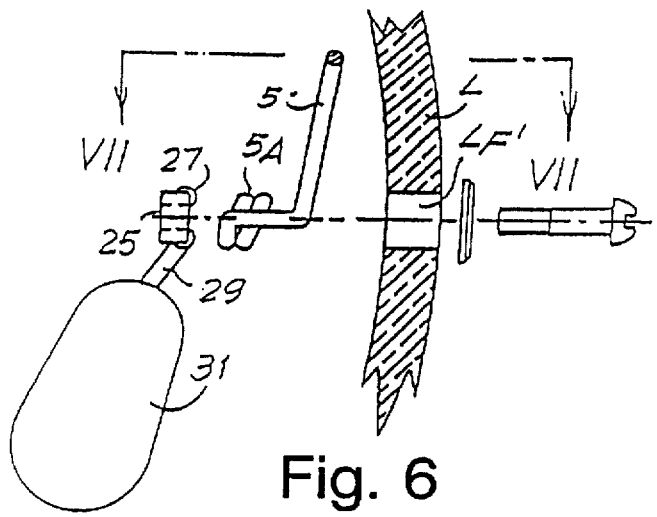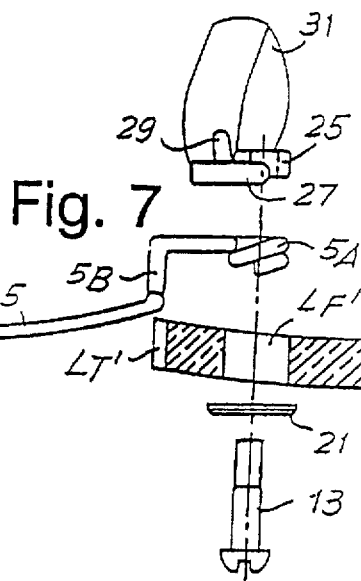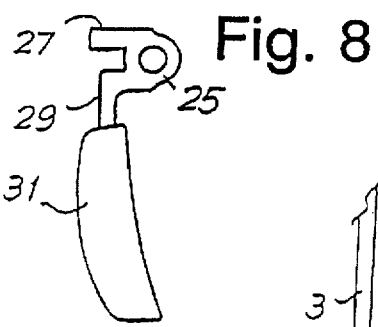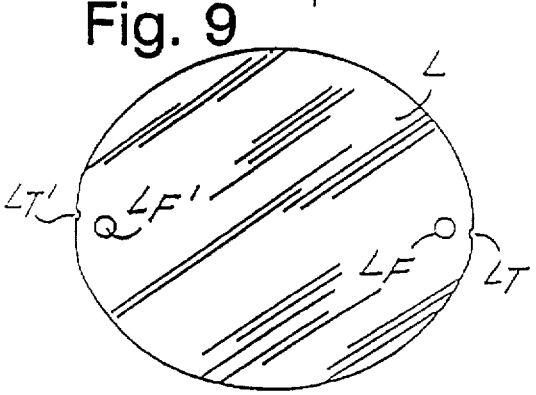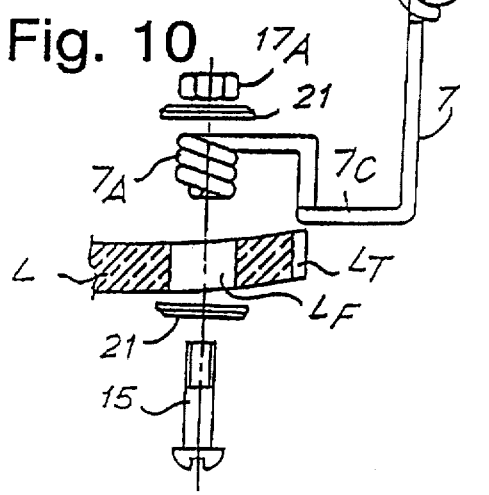

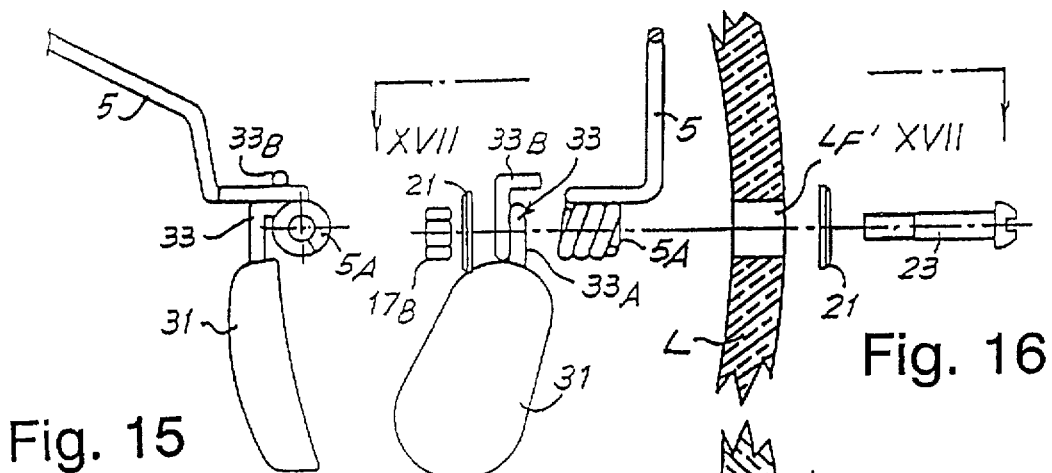
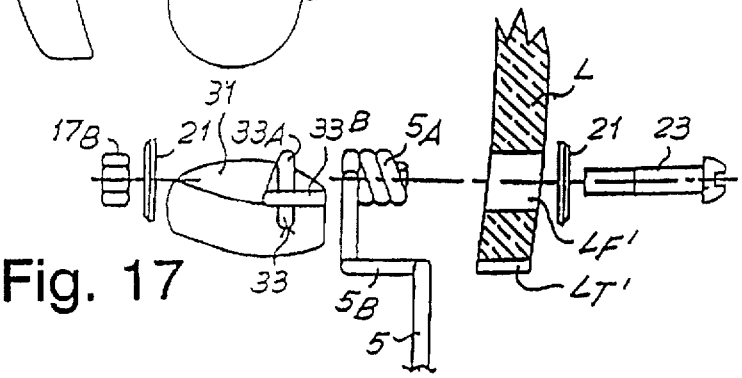
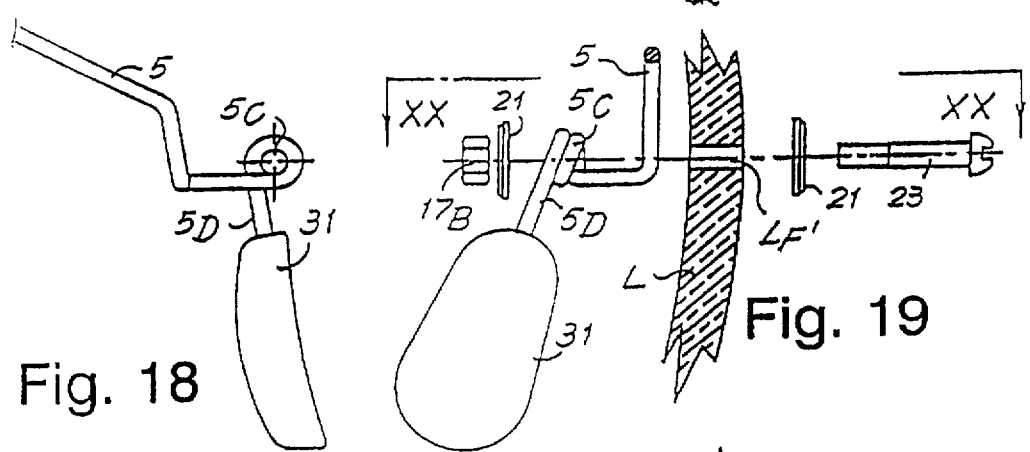
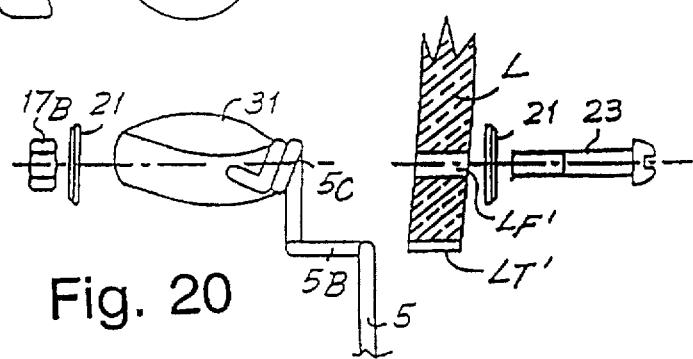

FRAME FOR SPECTACLES WITHOUT SURROUND

TECHNICAL FIELD

The invention relates to a spectacle frame of the type without a surround for the lenses.

More particularly, the invention relates to an improvement to a frame without surround, of the type comprising: a pair of arms; for each arm, An element for connection to the respective lens; an intermediate bridge for the connection of the two lenses; a pair of pads for support on the nose; means for locking the bridge and the connecting elements to the respective lenses.

PRIOR ART

Frames of this type are described, for example, in U.S. Pat. No. 718,363. In this frame, the arms are each formed by a metal wire which, in the end portion adjacent to the lens, forms a helical spring portion constituting a resilient articulation, and a clip for anchoring to the lens. Each arm is linked to the respective lens just by the fact of the resilient force exerted by the clip, and this does not ensure a reliable connection between arm and lens.

For the purpose of guaranteeing a more secure connection, alternative systems of connection between lenses and frame, and in particular between lenses and, intermediate bridge, as well as between lenses and arms, have been devised. By way of example, U.S. Pat. No. 4,502,765 contains a description of a connecting system in which each lens exhibits eyelet holes and in which in each hole there are inserted two pivot pins which are spaced from one another and which are integral with the intermediate bridge or with the arm. A locking screw is inserted between the pivot pins. This locking system exhibits the disadvantage that the eyelet hole in the lens is difficult and costly to construct. Furthermore, this hole exhibits sharp corners which constitute points of weakening and of initiation of phenomena of breakage of the lens.

In other known spectacles there is provided a circular hole, through which there passes the screw, surrounded by a resilient sleeve. The disadvantage of this solution is represented by the fact that the tightening of the screw gives rise to an expansion of the sleeve and consequently a breakage of the lens in correspondence with the hole. Spectacles of this type are illustrated, for example, in the publication FOCUS, No. 6/94, page 47, but in a version having a semi-surround for the lenses.

OBJECT OF THE INVENTION

The subject of the present invention is constituted by a frame without a surround for the lenses, which overcomes the disadvantages of the conventional frames.

In particular, a first subject of the present invention is the construction of a frame of the initially mentioned type, in which the arms and possibly the intermediate bridge can be linked to the lenses in a secure and reliable manner, without the risk of a relative movement with respect to the lenses and without risks of breakage of said lenses.

A further subject of the present invention is a frame which is of low cost and which is easy to assemble.

SUMMARY OF THE INVENTION

The aforementioned objects and further objects and advantages, which will become clear to persons skilled in the art upon reading the text which follows, are obtained with a frame of the initially mentioned type, in which the elements for connecting the arms to the lenses each exhibit a first bent end forming a helical spring intended to be inserted in a corresponding hole of the respective lens, the locking means comprising, for each lens, a screw inserted coaxially in said spring.

With this arrangement, the hole in the lens can be circular, and thus easy to construct. Furthermore, when the helically wound terminal end of the connecting element is inserted in the hole of the lens and the screw is tightened in order to lock the connecting element to the lens, practically no force is exerted on the wall of the hole of the lens, except that due to the slight forcing exerted by the helical spring. The tightening force exerted by the screw is discharged onto the main surfaces of the lens, with a lower specific pressure and thus without concentrated stresses.

In a particularly advantageous embodiment, each one of said connecting elements exhibits an intermediate portion forming a loop which, in the assembled condition, engages laterally in a notch formed along the edge of the respective lens. Once the lens has been assembled, this prevents any relative movement between the connecting element and the lens, which form a rigid assembly.

Advantageously, the second end of each connecting element, which end is opposite to said spring, forms a part of a hinge for the articulation of the respective arm.

For the purpose of locking the screw for tightening each connecting element against any possible rotations, in an improved embodiment of the invention the screws cooperate with corresponding threaded bushings, each exhibiting means for engaging on the corresponding connecting element.

The intermediate bridge can also be connected to the lenses by the same principle which is utilized for connecting the intermediate elements. In particular, in one embodiment the bridge exhibits two bent end portions forming respective helical springs which are inserted in corresponding holes of the lenses. Moreover, two screws for tightening the bridge onto the lenses are provided, said screws being disposed coaxially with the two springs constructed in correspondence with the end portions of said bridge.

For the bridge, there may also be provided anti-unscrewing means for the threaded bushings or nuts which cooperate with the respective screws.

In a particularly advantageous embodiment, the anti-unscrewing means also form support means for the pads or small plates for support on the nose. In this way, the number of components forming each frame is limited, and the production and the assembly thereof are consequently simplified. Further advantageous features of the frame according to the invention are described in the text which follows, with reference to a number of embodiments, and in the appended claims.

BRIEF DESCRIPTION OF THE DRAWINGS

The invention will be better understood upon following the description and the accompanying drawing, which shows a non-limiting practical exemplification of said invention. In the drawing:

FIG. 5 shows a detail, in front view, of the pad for support on the nose;

FIG. 6 shows an exploded view of the elements for connecting the pad and the intermediate bridge to the lens;

FIG. 7 shows a view according to VII—VII of FIG. 6;

FIG. 8 shows, separately, in front view, the element carrying the pad for support on the nose;

FIG. 9 shows, separately, one lens;

FIG. 10 shows a view similar to the view of FIG. 4, of a slightly modified embodiment;

FIG. 15 shows a front view, similar to FIG. 5, in a modified embodiment;

FIG. 16 shows an exploded view of the system for connecting the pad for support on the nose in the embodiment of FIG. 15;

FIG. 17 shows a view according to XVII—XVII of FIG. 16;

FIG. 18 shows a view, similar to the view of FIG. 15, in a modified embodiment;

FIG. 19 shows an exploded view, similar to the view of FIG. 16, of the embodiment of FIG. 18; and FIG. 20 shows a view according to XX—XX of FIG. 19.

DETAILED DESCRIPTION OF THE PREFERRED EMBODIMENTS

Figure 1:
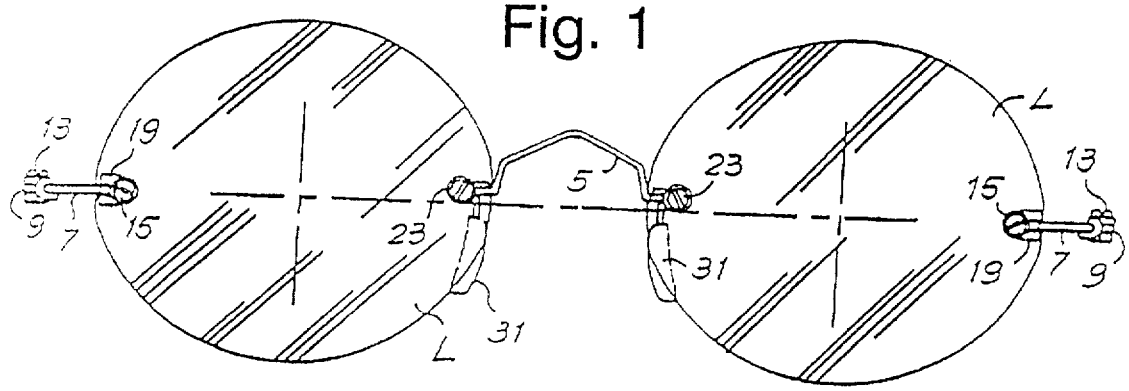
FIG. 1 shows a front view of a pair of spectacles equipped with a frame according to the present invention.
Figures 2, 3:
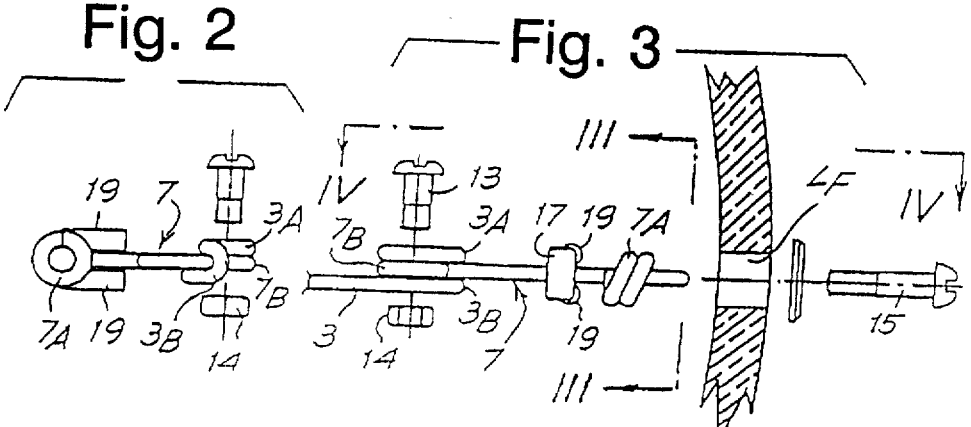
FIG. 2 shows an exploded view of the elements constituting the connection between the arm and the lens.
FIG. 3 shows a view according to III—III of FIG. 2.

FIGS. 1 to 9 show all the elements of a first embodiment of the frame according to the invention. Reference numeral 1 generally indicates, in FIG. 1, a pair of spectacles having two lenses L which are self-supporting, or, without surround, and to which the arms 3 and the intermediate bridge 5 are connected. Each arm 3 is connected to the respective lens by means of a connecting element 7, by means of a hinge 9 between the arm and the connecting element, which hinge permits the articulation of said arm.

The arms 3, the intermediate bridge 5 and the connecting elements 7 are constructed of resilient and non-allergic metal wire, such as for example stainless steel, gold or its alloys, titanium, or the like.

The end of each arm 3, which is linked to the respective connecting element 7, is bent to form an eyelet 3A and a loop 3B. Each intermediate element 7 forms, at a first end, a helical spring 7A, the external diameter of which is of dimensions such as to be inserted, with slight forcing, in a hole LF of the respective lens. The second end of each intermediate element 7 forms an eyelet 7B which, in the assembled condition, is disposed coaxially with the eyelet 3A to form an articulation hinge, supplemented by a pivot pin, constituted by a screw 13 and by a nut 14 or by an appropriately smoothed washer. The opening oscillation of each arm is limited by the abutment of the loop 3B against the connecting element 7. During this oscillation, the risk of unscrewing of the screw 13 from the washer or from the nut 14 is avoided in that both the head of the screw and the nut are in contact with surfaces of the wire forming the arm 3, and accordingly any relative sliding movement between screw and arm or between nut and arm is prevented.

Between the two ends 7A and 7B, the connecting element 7 forms a U-shaped loop indicated by 7C, one branch of which is caught in a notch LT along the peripheral edge of the lens L.

The locking of each connecting element 7, and thus of the respective arm 3, to the pertinent lens L takes place by means of a screw 15 which is inserted in the spring 7A and engages in a threaded bushing 17 with which two attachments 19 are integral, which attachments, in the assembled condition, embrace a portion of the respective connecting element 7, and thus the portion between the end which is helically wound to form the spring 7A and the U-shaped loop 7C. In this way, the threaded bushing 17 is fixed against rotation and accidental unscrewing. A washer 21 of plastic or similar material is disposed between the head of the screw 15 and the front surface of the lens L.

Figure 4:
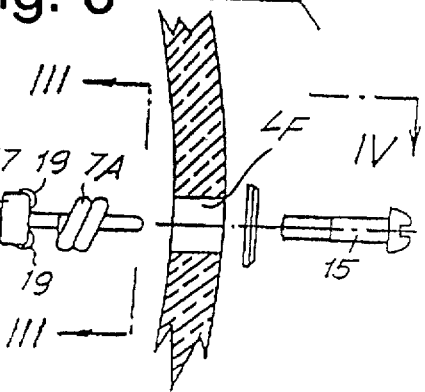
FIG. 4 shows a view according to IV—IV of FIG. 2.
Figure 4A:
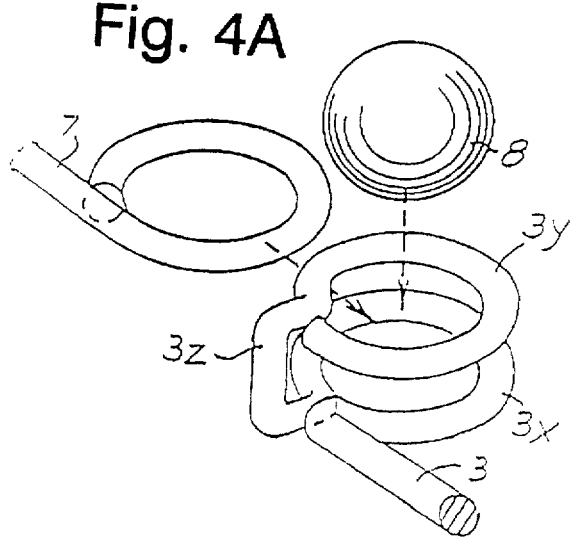
FIGS. 4A and 4B show a different embodiment of the articulating hinge between the arm and the connecting element.
Figure 4B:
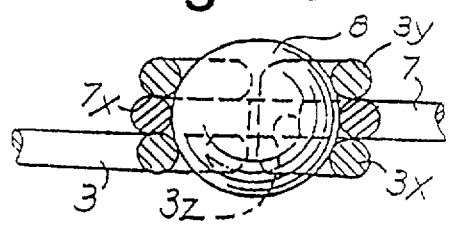

FIGS. 4A and 4B show a modified embodiment of the hinge 9. More particularly, FIG. 4A shows an exploded axonometric view of the hinge and FIG. 4B shows a cross section along a plane containing the axis of the hinge. According to this embodiment, the arm 3 forms, at its own end fixed to the connecting element 7, two eyelets 3X, 3Y which are spaced from one another along the axis of the hinge. Between the two eyelets 3X, 3Y there is inserted an eyelet 7X formed by the corresponding end of the connecting element 7. The mutual locking takes place by means of the insertion, under pressure, of a sphere 8, the diameter of which corresponds to the internal diameter of the eyelet 7X. The eyelets 3X and 3Y of lesser diameter retain the sphere in its position and are constructed in such a manner as to permit the insertion of the sphere in its working position by simple pressure and radial deformation of one of the eyelets 3X or 3Y, according to whether the sphere is inserted from one side or from the other. This configuration of the hinge is particularly simple to construct and to assemble, and avoids any problem of unscrewing, which may arise with the conventional hinges making use of screw means.

FIGS. 5 to 8 show the system for locking the bridge 5 to the lenses L. For this purpose, the terminal ends of the wire forming the bridge 5 are helically wound to form respective helical springs 5A, similar to the springs 7A formed with the wire of the connecting element 7. The springs 5A are inserted in corresponding holes LF (FIG. 9) of the respective lens L, which are identical with the holes LF.

A screw 23 is inserted coaxially in each spring 5A and engages into a corresponding threaded bushing or nut 25, similar to the threaded bushing 17 and exhibiting attachments 27 and 29 which embrace a portion of the wire forming the bridge 5 (FIG. 5). The attachment 29 is extended so as to form a stirrup, to which is integrally fixed the respective pad 31 for support of the frame on the nose.

The metal wire forming the bridge 5 exhibits two intermediate portions 5B which engage in corresponding notches LT constructed peripherally along the edge of the lens. In this way, once the screws 23 have been tightened, any relative movement between the lenses L and the bridge 5 is prevented.

FIGS. 10 to 20 show a number of constructional variants of the frame which is described in detail with reference to FIGS. 1 to 9. Identical numerals are used to indicate identical or corresponding parts.

FIG. 10 shows a variant embodiment of the system for locking the connecting element 7 to the lens L. In this configuration, the screw engages on a threaded bushing constituted by a simple nut 17A, having no anti-unscrewing attachments. Between the nut 17A and the rear surface of the lens L there is disposed a second washer 21.

Figure 11:
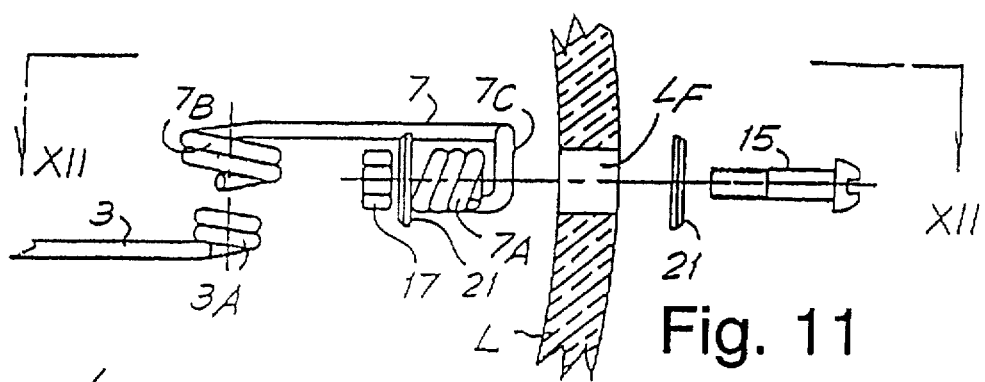
FIG. 11 shows an exploded view, similar to the view of FIG. 2, of a slightly modified embodiment.
Figure 12:
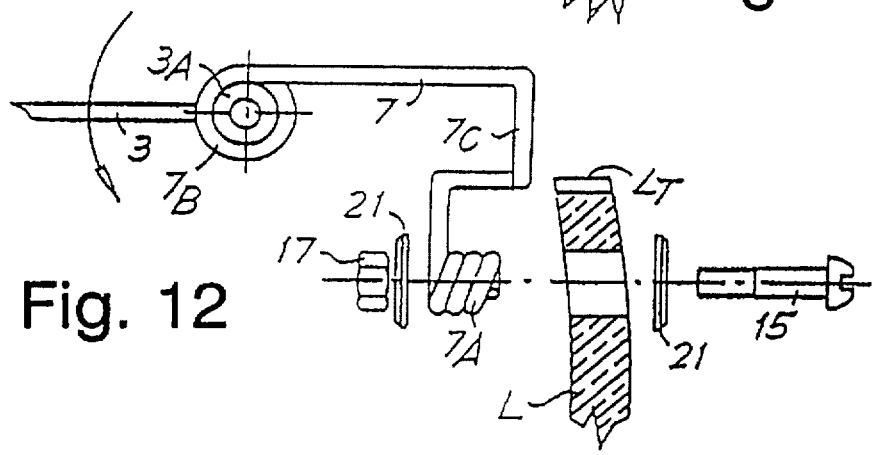
FIG. 12 shows a view according to XII—XII of FIG. 11.

FIGS. 11 and 12 show a constructional variant of the embodiment of FIG. 10. The variant concerns the form of construction of the articulation hinge 9 between the connecting element 7 and the respective arm 3. Said hinge is formed, in this case, by the two ends 3A and 7B of the arm 3 and of the connecting element 7 respectively, which are conformed no longer as a simple eyelet but in the form of a helical spring, the spring 7B being of greater diameter and the spring 3A being inserted coaxially within the spring 7B.

Figure 13:
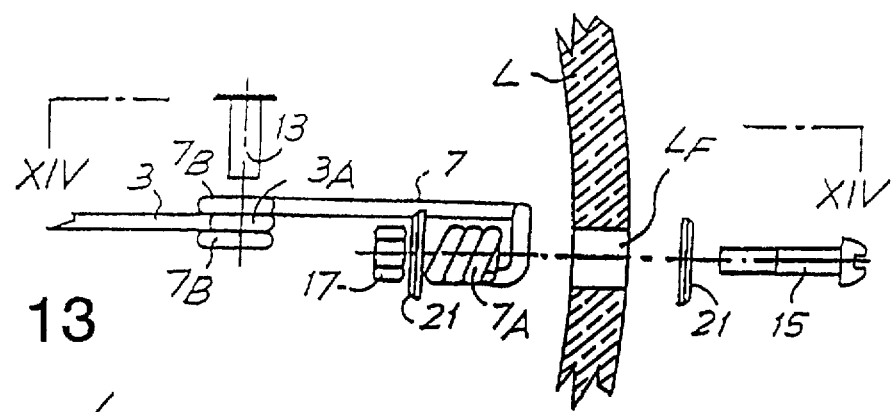
FIG. 13 shows an exploded view, similar to the view of FIG. 2, in a further embodiment.
Figure 14:
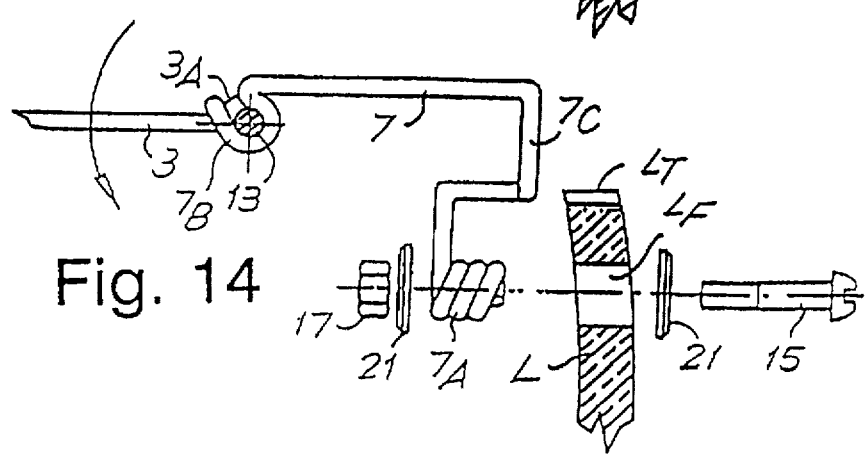
FIG. 14 shows a view according to XIV—XIV of FIG. 13.

FIGS. 13 and 14 show a further variant of construction of the articulation hinge between arm 3 and connecting element 7. In this case, the articulation is obtained by means of a central pivot pin 13, inserted in two eyelets 3A and 7B which are formed by the arm 3 and by the connecting element 7 respectively. In this case, the connecting element 7 forms a double eyelet 7B and between the two turns of the double eyelet there is inserted the eyelet 3A formed by the end of the arm 3.

FIGS. 15 to 17 illustrate a different system of construction of the pads 31 for support on the nose. In this case, each pad 31 is carried by a respective stirrup 33 which forms an eyelet 33A and a terminal hook portion 33B which engages on the bridge 5, as shown in particular in FIG. 15. The hook 33B prevents the rotation of the pad 31 once the screw 23 has been tightened.

FIGS. 18 to 20 show, finally, a variant in which the stirrups which carry the pads 31 are constructed from terminal ends 5D of the wire forming the bridge 5. Said wire also forms eyelets 5C into which the tightening screws 23 are inserted.

The various illustrated variants can be combined with one another according to any arrangement.

It is understood that the drawing shows only an exemplification given only by way of practical demonstration of the invention, it being possible for this invention to vary in forms and arrangements without nevertheless departing from the scope of the concept which forms the basis of said invention. The possible presence of reference numerals in the appended claims has the purpose of facilitating the reading of the claims with reference to the description and to the drawing, and does not limit the scope of the protection represented by the claims.

I claim:

1. A frame for spectacles without a surround for the two lenses, including:
   a pair of arms;
   arm connecting elements, each of said arm connecting elements connecting an associated one of said arms to the respective lens of the two lenses;
   an intermediate bridge;
   a pair of pads;
   bridge locking means for locking the bridge to the respective lenses;
   connecting element locking means for locking said connecting elements to the respective lenses; and
   wherein said connecting elements each include a first bent end forming a helical spring inserted in a corresponding hole of the respective lens, said connecting element locking means comprising, for each lens, a screw inserted coaxially in said spring.

2. The frame according to claim 1, in which each one of said connecting elements includes an intermediate portion forming a loop which, in the assembled condition, engages laterally into a notch formed along the edge of the respective lens.

3. The frame according to claim 1, in which the second end of each connecting element, which end is opposite to said spring, forms a part of a hinge for articulation of the respective arm.

4. The frame according to claim 3, in which each arm includes a terminal end forming an articulation eyelet, and in which said eyelet is rotationally engaged, by means of an articulation pivot pin, on the respective hinge part formed by the corresponding connecting element.

5. The frame according to claim 3, in which said pivot pin comprises a screw and a nut or a smoothed washer, said nut or washer and said screw being in contact with the respective arm and not with said connecting element, to avoid the unscrewing of said screw from said nut or washer.

6. The frame according to claim 3, in which each arm includes a terminal end shaped to form an eyelet, rotationally engaged on the hinge part formed by the respective connecting element, without axial articulation pivot pin.

7. The frame according to claim 3, in which the terminal end of each arm forms an abutment which limits the opening oscillation of the arm.

8. The frame according to claim 1, wherein said connecting element locking means includes screws cooperating with corresponding threaded bushings each including engagement means for engagement on the corresponding connecting element.

9. The frame according to claim 8, in which said engagement means comprises pairs of attachments which, in the assembled condition, embrace a portion of the respective connecting element.

10. The frame according to claim 1, in which said bridge includes two bent end portions forming respective helical springs which are inserted in corresponding holes of the lenses, and two screws for tightening the bridge to the lenses, said screws being inserted coaxially in the respective springs.

11. The frame according to claim 10, in which said screws cooperate with corresponding nuts equipped with fixing means for fixing said nuts to the bridge.

12. The frame according to claim 11, in which said fixing means supports a corresponding one of said pair of pads.

13. The frame according to claim 1, in which said bridge includes intermediate portions which engage in corresponding peripheral notches constructed on the edges of the lenses.

14. The frame according to claim 1, in which each of said pair of pads is carried by a stirrup engaging the frame.

15. The frame according to claim 14, in which said engagement means are constituted by eyelets disposed coaxially with the springs formed at the ends of the bridge, and in which the screws for tightening the bridge also lock the stirrups to the lenses.

16. The frame according to claim 14, in which said stirrup includes a hook portion which cooperates with the bridge to fix the stirrup against rotation.

17. The frame according to claim 1, in which each arm is connected to the respective connecting element by means of a hinge having a spherical element.

18. The frame according to claim 17, in which said arm forms two eyelets which are substantially coaxial and spaced along the common axis, said connecting element forming an eyelet of greater diameter than the eyelets formed by said arm, said connecting element eyelet being disposed coaxially with respect to said two eyelets of said arm and between said two eyelets of said arm, the spherical element being caught and retained between said connecting element eyelet and said two eyelets of said arm.

19. The frame according to claim 1, in which said bridge includes two eyelets, said bridge locking means including screws, each of said screws being inserted into a corresponding said two eyelets for locking the bridge to the respective lenses, and in which the ends of said bridge form stirrups for supporting said pair of pads.

20. The frame according to claim 1, in which said arms, said bridge and said connecting elements are constructed of metal wire.

21. A frame for spectacles without a surround for the lenses, including:

a pair of arms;

for each arm, a connecting element for connection to the respective lens;

an intermediate bridge having two ends for connected to the two lenses respectively;

a pair of pads for support on a nose of a wearer of the spectacles;

screw means for locking the bridge to the respective lenses, said screw means including screws, said screws engaging corresponding threaded bushings, each of said bushings having attachments which embrace a respective portion of the bridge, one of said attachments of each bushing extending to form a stirrup to which the respective pad is fixed.

22. The frame according to claim 21, including second screw means for locking the connecting elements to the respective lenses, said second screw means including screws which cooperate with corresponding second threaded bushings each including engagement means for engagement on the corresponding connecting element.

23. The frame according to claim 22, in which said engagement means comprises pairs of attachments which, in the assembled condition, embrace a portion of the respective connecting element.

24. A frame for spectacles including:

a first lens;

a second lens;

a first arm including a metal wire portion;

a second arm including a metal wire portion;

a first connecting element including a metal wire portion, said first connecting element connecting said first arm to said first lens, said metal wire portion of said first connecting element being separate from said metal wire portion of said first arm;

a second connecting element including a metal wire portion, said second connecting element connecting said second arm to said second lens, said metal wire portion of said second connecting element being separate from said metal wire portion of said second arm;

a first hinge connecting said first arm to said first connecting element, said first hinge including a first eyelet formed by said wire portion of one of said first arm and said first connecting element, two spaced and substantially axially aligned second eyelets formed as part of said wire portion of the other of said first arm and said first connecting element, and a pivoting member extending coaxially with respect to said first eyelet and said second eyelets; and a second hinge connecting said second arm to said second connecting element, said second hinge including a second hinge first eyelet formed by said wire portion of one of said second arm and said second connecting element, two spaced and substantially axially aligned second hinge second eyelets formed as part of said wire portion of the other of said second arm and said second connecting element, and a second hinge pivoting member extending coaxially with respect to said second hinge first eyelet and said second hinge second eyelets.

25. The frame according to claim 24, in which said pivoting member and said second hinge pivoting member are each a spherical element.

26. The frame according to claim 25, in which said first arm forms said second two eyelets, said first connecting element forming said first eyelet of greater diameter than said second two eyelets, said first eyelet being disposed coaxially with respect to said second two eyelets and between said second two eyelets, said pivoting member being caught and retained between said first eyelet and said second two eyelets.

27. The frame according to claim 24, in which the terminal end of each arm forms an abutment which limits the opening oscillation of the arm.

28. A frame for spectacles including:

a first lens;

a second lens;

a first arm including a metal wire portion;

a second arm including a metal wire portion;

a first connecting element connecting said first arm to said first lens;

a second connecting element connecting said second arm to said second lens;

a first hinge connecting said first arm to said first connecting element, said first hinge including a first eyelet formed by said wire portion of said wire portion of said first arm, a second eyelet formed as part of said wire portion of said first connecting element, and a pivoting member extending coaxially with respect to said first eyelet and said second eyelet, and one of said wire portion of said first arm and said wire portion of said first connecting element forms a loop which defines and abutment limiting an opening position of said first arm with respect to said first connecting element;

a second hinge connecting said second arm to said second connecting element, said second hinge including a second hinge first eyelet formed by said wire portion of said second arm, a second hinge second eyelet formed as part of said wire portion of said second connecting element, and a second hinge pivoting member extending coaxially with respect to said second hinge first eyelet and said second hinge second eyelet and one of said wire portion of said second arm and said wire portion of said second connecting element forms a loop which defines and abutment limiting an opening position of said second arm with respect to said second connecting element.

* * * * *